Feb. 6, 1962  G. NATTA ETAL  3,020,174
METHOD OF GRAFT POLYMERIZING MONOMERS ONTO A SHAPED
ARTICLE OF PEROXIDIZED POLYMERS OF PROPYLENE AND
COPOLYMERS OF PROPYLENE AND ETHYLENE
Filed March 5, 1957
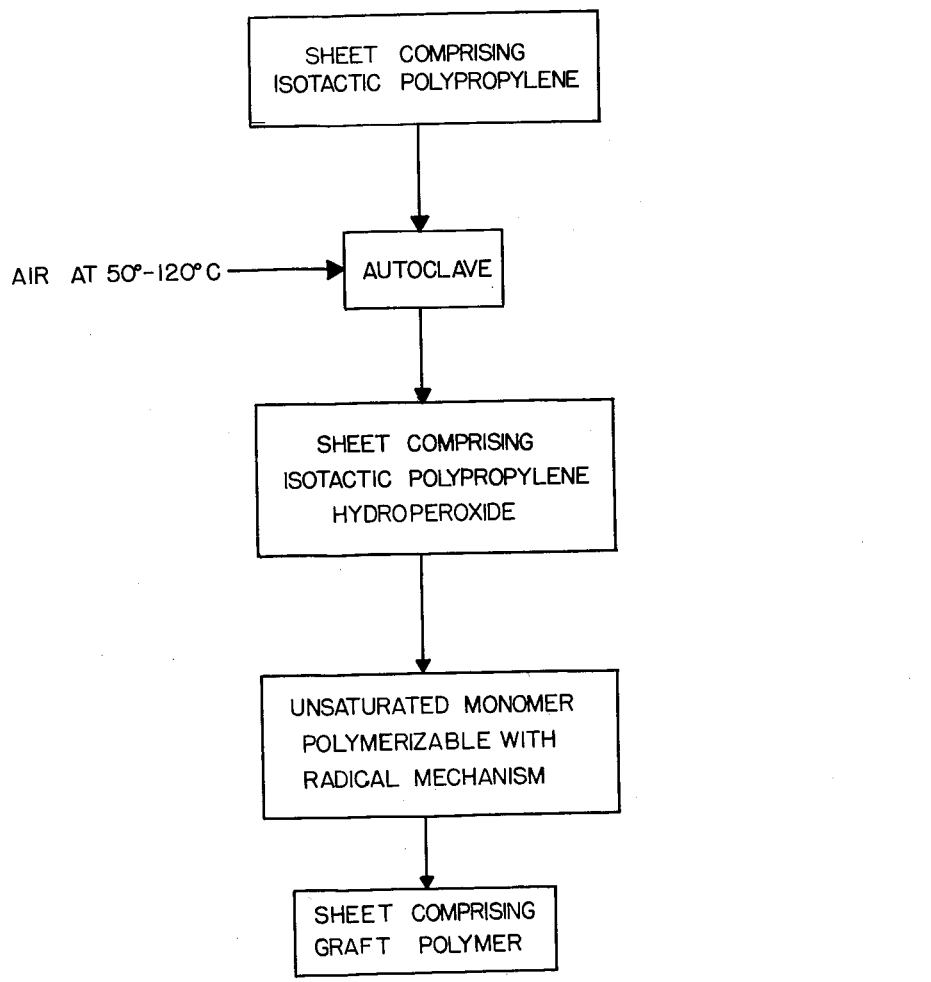
INVENTORS
GIULIO NATTA, ENRICO BEATI
FEBO SEVERINI
BY Toulmin & Toulmin
ATTORNEYS 3,020,174
Patented Feb. 6, 1962

3,020,174
METHOD OF GRAFT POLYMERIZING MONOMERS ONTO A SHAPED ARTICLE OF PEROXIDIZED POLYMERS OF PROPYLENE AND COPOLYMERS OF PROPYLENE AND ETHYLENE
Giulio Natta, Enrico Beati, and Febo Severini, Milan, Italy, assignors to Montecatini, Societa Generale per l'Industria Mineraria e Chimica, Milan, Italy
Filed Mar. 5, 1957, Ser. No. 643,915
Claims priority, application Italy Mar. 14, 1956
29 Claims. (Cl. 117—47)

This invention relates to new polymeric materials. More particularly, the invention relates to peroxidized high polymers of propylene and copolymers of propylene and ethylene and to methods of making them. In a still more particular sense, the invention relates to shaped articles of the high polymers and copolymers which have polymeric chains of certain monomers grafted onto the surface thereof, and to methods for obtaining the articles.

It is known that polymers which contain tertiary carbon atoms in the main chain can be peroxidized by the action thereon of oxygen or oxygen-containing gaseous mixtures. Under the conditions previously used to effect the peroxidation, the reaction proceeded slowly and, therefore, it has been the practice to resort to special expedients, such as the use of catalysts, for accelerating the peroxidizing reaction.

For example, it has been proposed to carry out the peroxidation in the presence of initiators such as ozone, ultraviolet rays, or of other high energy radiations such as beta- and gamma-rays. The use of beta- and gamma-rays facilitates the peroxidation of even those polymers which are low in tertiary carbon atoms, such as polyethylene.

Peroxides of the polymers can be obtained, also, by the fixation of atmospheric oxygen on the solid polymers under the influence of beta- and gamma-rays. The peroxidation with the aid of those rays can be effected at relatively low temperatures, but the method has the disadvantage that the beta- and gamma-rays generally promote secondary reactions, such as depolymerization, cross-linking, etc. to an extent which varies depending on the polymer being peroxidized.

It is also known that some polymers containing tertiary carbon atoms in the main chain can be peroxidized easily at high temperatures. However, the high temperatures result in considerable depolymerization of the polymers, which has an adverse effect on the mechanical properties thereof. In fact, it is common practice to incorporate anti-oxidants in such polymers as polyethylene in order to prevent oxidation and consequent degradation of the polymer.

The Italian Patent No. 556,509, issued February 2, 1957, discloses an improved method for peroxidizing certain polymers containing tertiary carbon atoms which comprises effecting the peroxidation with the aid of the auto-catalytic action of pre-formed hydroperoxides or by exposing the polymers to oxygen in the presence of substances, such as cumene, which readily form peroxides. Under the last-mentioned conditions, during the chain reaction which leads to the formation of cumene hydroperoxide, a transfer of the reaction chain to the polymer takes place. When the peroxidation of the polymer is carried out in a homogeneous solution, a statistical distribution of the hydroperoxide groups in the polymer is obtained in practice.

When peroxidic oxygen is bound to the chains of polymers containing tertiary carbon atoms, it is possible to graft onto the peroxidized polymer, polymeric chains of monomers which are polymerizable by a radical mechanism. The peroxidic oxygen bound to the base polymer acts to initiate the polymerization of the monomer polymerizable by the radical mechanism.

Surprisingly, it is now found that in the case of the linear, isotactic and non-isotactic (atactic) high molecular weight polymers of propylene produced for instance by the methods described in the Italian Patents No. 535,712, issued November 17, 1955 and No. 537,425, issued December 28, 1955, and in the case of non-isotactic (amorphous) copolymers of propylene and ethylene such as are produced by the methods disclosed in the Italian Patent No. 554,803, issued January 16, 1957, sufficient oxygen in peroxidic form to permit satisfactory grafting of polymeric chains of the monomer polymerizable with a radical mechanism can be introduced into the propylene polymers and propylene-ethylene copolymers, even in the absence of a catalyst, by exposing the polymers and copolymers to air or oxygen containing gaseous mixtures at a temperature of 50° C. to 120° C. for a time such that no appreciable degradation of the polymer or copolymer occurs.

It is found, further, that using these conditions it is possible to carry out the peroxidation directly on shaped articles comprising the linear propylene polymers under heating of the articles at temperatures below the temperature of visible melting of the polymer. By carrying out the peroxidation reaction at temperatures below 90° C., e.g., between 50° C. and 85° C., degradation is particularly minimized and the mechanical properties of the articles and the molecular weight of the polymer are practically unchanged as a result of the peroxidation.

Peroxidation can take place to a certain extent even at lower temperatures (20 to 30° C.) by exposing the polymer to air or oxygen-containing gaseous mixtures, particularly if peroxide groups are present, which act auto-catalytically.

Linear, regular head-to-tail polymers of propylene which are predominantly isotactic are substantially impermeable to gases, so that when articles formed thereof are peroxidized, the peroxidation takes place predominantly on the surface of the article or extends to only a very limited extent below the surface diffusing through the amorphous zones which are permeable to oxygen.

Such articles comprising the superficially peroxidized isotactic polypropylene are suitable for important uses. For example, it is possible to graft polymeric chains of different monomers onto the surface of the articles. Such grafting occurs spontaneously in the heat and can be brought about by simply immersing the superficially peroxidized articles in a liquid or gaseous phase containing the monomers of the polymers to be grafted onto the articles. In this way, it is possible to change the surface properties of the articles comprising the isotactic polypropylene which is peroxidized at or close to the surface of the article, without resort to complicated and expensive techniques.

For instance, it is possible to render the surface of the shaped article lyophilic to certain solvents for which the polypropylene is normally lyophobic, to alter the dye-acceptance characteristics of the polypropylene article, to alter the capacity of the article to bond to adhesives or inks, to improve the receptivity of the articles to ink, change the printing characteristics thereof, or to obtain particular decorative effects on the surface of the article.

The linear, regular head-to-tail polypropylene which is peroxidized in accordance with the invention may be non-isotactic (amorphous) or isotactic. As is known, under appropriate conditions, the isotactic polymers may be crystalline. In the preferred embodiment, the polymers peroxidized in accordance with this invention are isotactic or predominantly isotactic polypropylenes which, although they contain tertiary carbon atoms, show a high crystallinity. These isotactic polymers are preferred because the most valuable results are obtained therewith. In the absence of non-isotactic amorphous polymers, the peroxidation under the present conditions takes place prevailingly at the surface of the crystals or in the inter-crystalline amorphous zones closest to the outer surface of the shaped article treated. Peroxidation of the articles comprising the isotactic polypropylene by exposing the article to air at a temperature of 50° C. to 120° C., preferably 60° C. to 90° C., results in a high concentration of peroxide groups on the polymer chains at the surface of the article, without any substantial change in the mechanical properties of the polymer constituting the article, or in the average molecular weight thereof.

The present method makes it possible to modify the dyeing characteristics of normally difficultly dyeable filaments of isotactic polypropylene so that the filaments become readily dyeable.

As noted hereinabove, the method of this invention can be applied to the peroxidation of shaped articles comprising linear, regular head-to-tail predominantly or wholly amorphous polypropylene. This is possible, provided the molecular weight of the amorphous polymer is high, above about 20,000, and the articles do not melt or warp to any marked extent at temperatures below 60° C.–70° C. The amorphous polypropylenes are less impervious to gases than the isotactic polymers. Therefore, the oxygen dissolves more readily in the amorphous polymers, especially in those having relatively low intrinsic viscosity, which means that molded or extruded articles of the amorphous polymers can be peroxidized not only at the surface but also in depth.

The present method is also applicable to articles comprising amorphous copolymers of propylene and ethylene such as can be prepared, for example, by the method described in the Italian Patent No. 554,803 supra.

The present method can be carried out in different ways. A preferred embodiment is described generally below:

The shaped articles of the polymer to be peroxidized, such as sheets of filaments of isotactic polypropylene, are treated with an oxygen-containing gaseous mixture, for example, air, at a temperature between 50° C. and 120° C. Instead of air, mixtures of nitrogen and air, or air enriched in oxygen can be used.

The surface peroxidation can be carried out at atmospheric pressure or, more rapidly under somewhat higher pressures, for example under a pressure of 3 to 4 atmospheres.

The time required for the attainment of the desired degree of peroxidation depends upon the reaction conditions and upon the oxygen content of the gaseous mixture.

In general, when grafting of polymeric chains onto the surface of the article is to follow the peroxidation, it is sufficient, in the case of sheets of isotactic polypropylene having a thickness of 0.1–0.2 mm. and containing less than 10%–15% of amorphous, non isotactic polymer soluble in ethyl ether, to subject the sheets to the peroxidizing conditions until the amount of oxygen taken up in the form of peroxide (—O—O—) groups is such that the weight of the article is increased by a few hundreds of a gram for each 100 grams of the article weight. The mechanical properties of the sheets thus obtained differ to only a slight extent from the properties of the sheets prior to the peroxidation. At the same time, such small amounts of active oxygen are more than sufficient to initiate a polymerization reaction of vinyl monomers (polymerization with the aid of a "free radical" mechanism) so that when the peroxidized article is contacted with a polymerizable vinyl monomer, the latter is polymerized and the polymeric chains thus formed are, for the most part, grafted onto (i.e. chemically bound to) the surface of the shaped article comprising the propylene polymer.

It is simpler, and therefore preferred, to refer the quantity by weight of peroxidic oxygen taken up by the article to the surface area thereof, rather than to the weight of the article. Thus calculated, it can be stated that in the case of a sheet of the propylene polymer having a thickness of 0.1 mm., a content of 0.02% by weight peroxidic oxygen corresponds to 0.011 g./m.$^2$. In the case of a sheet of 0.3 mm. thickness, the same content of peroxidic oxygen (0.011 g./m.$^2$ calculated on the surface area) is obtained with a content of about 0.007% peroxidic oxygen by weight.

It is assumed that the peroxidic oxygen is in the form of hydroperoxide groups. When the analytical determination is made iodometrically the percentage of peroxidic oxygen is calculated by multiplying the amount of iodine set free by 100 parts of peroxidized polymer by the ratio $O_2/J_2 = 0.125$.

When the sheets of the propylene polymer or of the amorphous propylene-ethylene copolymer are very thin, or if the polymer or copolymer is in the form of very fine filaments, it is necessary, for good grafting, to increase the amount of oxygen bound to the polymer chains in the peroxidic form. For example, the peroxidic oxygen content of filaments of isotactic polypropylene having a diameter of 25 microns and having a tensile strength of 5 to 6 gms./denier, can be as high as 0.1–0.2% by weight without significant deterioration of the mechanical properties of the filament. On the other hand, at a peroxidic oxygen content above 0.4% by weight, a considerable decrease in the mechanical strength of the filament is in general observed. The oxygen content of 0.1–0.2% by weight is sufficient to result in good grafting. The oxygen content of 0.2% by weight corresponds to 0.018 g./m.$^2$ of surface area of the filament. In practice, in sheets of 0.1 mm. thickness a similar content (0.018 g./m.$^2$ of surface area) corresponds to about 0.03% by weight of oxygen.

When sheets, films or the like of amorphous polypropylene or of the amorphous propylene-ethylene copolymers are peroxidized, the peroxidation takes place both at the surface and at the interior of the sheet, etc. If such sheets and the like are comparatively thick, higher percentages of peroxidic oxygen can be present on and in the article. For example, 0.5% or more of peroxidic oxygen can be introduced into sheets having a thickness of 0.5 mm. without inducing the degradation due to depolymerization which would result if 0.5% of peroxidic oxygen were introduced into an article having the same thickness but consisting of isotactic polypropylene.

It is possible, by the present method, without using solvents, and in an extremely simple and economical way, to obtain peroxidized amorphous polypropylene and amorphous propylene-ethylene copolymers having a high molecular weight and a high viscosity. The peroxidized amorphous polymers and copolymers can be used for the production of grafted polymers.

Polymeric chains can be grafted onto the surface of the polymers and copolymers peroxidized by the present method, in various ways. Preferably, the grafting is effected by immersing the articles comprising the peroxidized polymer in the monomer polymerizable with the aid of the peroxidic oxygen (radical polymerization) or in a solution of such monomer in a suitable solvent. Generally, the article is immersed in the monomer or solution at a temperature above 50° C., although the temperature varies depending on the particular monomer used. For example, when the monomer is methyl methacrylate, the immersion is preferably effected at a temperature of 60° C. to 80° C. The immersion time required to insure a predetermined increase in the weight of the article, corresponding to the grafting of polymeric chains onto the surface of the article comprising the peroxidized polypropylene, will depend not only on the temperature of immersion but also on the monomer used, and can be determined empirically.

When the desired increase in weight is reached (indicating that the polymeric chains have been grafted onto the surface of the article to the desired extent), the article is removed from the monomer or solution thereof, washed with solvents to remove unchanged monomer adhering thereto, and then dried.

The following examples are given to illustrate preferred embodiments of the invention, it being understood that these examples are not intended as limitative.

Example 1

Sheets of predominantly isotactic high polymer of propylene (85% of polymeric material insoluble in boiling heptane) having a thickness of 0.16 mm. moulded at 180° C. and stretched 500% of the initial length, are used.

The mechanical properties of these sheets are the following: $e=27\%$, $s=20$ kg./mm.$^2$ (with $e$ the elongation at break and with $s$ the ultimate tensile strength).

The sheets are suspended in a stainless steel autoclave heated to 70° C. Air is introduced at a pressure of 3 atm. After 5 hours the treated sheets have a content in peroxidic oxygen of about 0.03% by weight, corresponding to 0.026 g./m.$^2$ of surface area. (In this and in the following examples the oxygen content indicated is the amount present in the form of peroxide groups, two atoms of oxygen being considered for each of said groups.) The mechanical properties of the sheets remain unchanged ($e=27\%$; $s=20$ kg./mm.$^2$).

If heating to 70° C. is extended up to 7 hours, the content in peroxidic oxygen reaches 0.05% by weight (corresponding to 0.044 g./m.$^2$; the mechanical properties are not significantly altered; $e=27\%$, $s=18.4$ kg./mm.$^2$).

Example 2

Polypropylene sheets having properties equal to those of the foregoing example are suspended in a glass container of about 1 liter capacity, at a temperature of 90° C. A nitrogen-oxygen mixture containing 10% oxygen is then introduced at room pressure. After 24 hours the treated sheets show a content in peroxidic oxygen of 0.02% by weight (0.017 g./m.$^2$). The mechanical properties are still unchanged ($e=25\%$, $s=20$ kg./mm.$^2$).

Example 3

A sample of an amorphous polypropylene, consisting of the ethyl ether-extractable fraction of the crude polymer (obtained by polymerizing propylene in accordance with the methods described in the pending applications of G. Natta et al. supra) is molded by die-casting into sheets of about 0.20 mm. in thickness. These sheets are suspended in a stainless steel autoclave which is heated to 70° C. Air is introduced until a pressure of 5.0 atm. is attained. After 7 hours the treated sheets show a content in peroxidic oxygen of 0.48%. The initial polypropylene used had an intrinsic viscosity, as determined in tetralin at 135° C., of 1.12 cm.$^3$/g., corresponding to an average molecular weight of about 38,000. The peroxidized polypropylene has an intrinsic viscosity of 0.92 cm.$^3$/g., corresponding to an average molecular weight of 28,300.

Example 4

A skein of a 16-filament yarn of a prevailingly isotactic polypropylene, having the following mechanical properties: $e=30\%$; $s=5.4$ g./den.; count in deniers=87 (5.4 deniers for each filament), is placed in a glass container of about 1 liter capacity at a temperature of 85° C. Air is then introduced under normal pressure. After 14 hours, the treated yarn has a content in peroxidic oxygen of 0.2% by weight (corresponding to 0.03 g./m.$^2$ of surface area). The mechanical properties of the peroxidized filaments are: $e=23\%$; $s=5.3$ g./den.

Example 5

Sheets of 0.2 mm. in thickness, obtained by molding an amorphous ethylene-propylene copolymer (prepared, for example, in accordance with the process described in the pending application of G. Natta et al. Ser. No. 629,085, filed December 18, 1956, having an intrinsic viscosity, as determined in tetralin at 135° C., of 2.77 g./cm.$^3$, corresponding to a molecular weight of about 152,000, are suspended in a stainless steel autoclave. The whole is heated to 80° C. and air is introduced till a pressure of 5.0 atm. is attained. After 5 hours, the treated sheets show a content in peroxidic oxygen of 0.6% by weight. The intrinsic viscosity, as determined in tetralin at 135° C., of the peroxidized copolymer is 2.6 g./cm.$^3$, corresponding to a molecular weight of about 138,000.

Example 6

A sheet formed of an isotactic high polymer of propylene and as described in Examples 1 and 2 is superficially peroxidized as in those examples to a peroxidic oxygen content of 0.05% by weight. The peroxidized sheet is then immersed in liquid methyl methacrylate at a temperature of 70° C. After 3 hours, the sheet is removed and washed with methanol to remove the small amounts of monomeric methyl methacrylate adhering to the surface thereof. The surface, after the washing, is covered by a very adherent layer of poly (methyl methacrylate). The sheet has increased in thickness from 0.16 mm. to 0.42 mm. The increase in the weight of the sheet is 162%, and is substantially due to poly (methyl methacrylate) chains grafted onto the surface, as a consequence of the free-radical polymerization initiated by the hydroperoxide groups bound to the polypropylene.

In contrast, when similar sheets of the isotactic high polymer of propylene are immersed, without peroxidation of the polymer, in the liquid methyl methacrylate at 70° C. for four hours, and the sheets are then removed, washed with methanol, and dried, no increase in the weight of the sheet, and no change in the mechanical properties can be observed.

The adhesion of the poly (methyl methacrylate) layer to the surface of the peroxidized sheets is due to the fact that a part of the polymeric methyl methacrylate chains are grafted on the surface of the polypropylene. The product has the following mechanical properties: $e=68.8\%$; $s=6.13$ kg./mm.$^2$. The ultimate tensile strength, referred to the initial cross section of the sheet before peroxidation, is 16.2 kg./mm.$^2$, which shows that the layer of grated polymer has not increased the tensile strength of the sheet but has increased its elongation at break. In fact, the layer of poly (methyl methacrylate) grated on the polypropylene does not contribute to the strength of the sheet unless the latter is submitted to a suitable heat treatment.

Example 7

A skein of a polypropylene yarn equal to that used in Example 4, superficially peroxidized to a content in peroxidic oxygen of 0.2%, is immersed in liquid methyl methacrylate at 75° C. After 3 hours the skein is removed, washed with methanol, and dried. A weight increase of 38% is noted; this increase is substantially due to a surface grafting of poly (methyl methacrylate) chains, as a consequence of the free-radical polymerization initiated by the hydroperoxide groups bound to the polypropylene.

The yarn thus obtained has the following mechanical properties: $e=22\%$; $s=5$ g./den. (referred to the count before grafting).

Example 8

A stretched sheet of a prevailingly isotactic high polymer of propylene, peroxidized superficially to a content in peroxidic oxygen of 0.03%, shows the following mechanical properties: $e=35\%$; $s=14$ kg./mm.$^2$. After immersion in styrene at 70° C. for 24 hours and subsequent washing with methanol, it is covered by a very adherent polystyrene layer. The increase in weight is 163% and is substantially due to polystyrene chains grafted onto the polypropylene surface. The thickness has increased from 0.10 mm. to 0.4 mm.

The mechanical properties are now: $e=61.8\%$; $s=6.25$ kg./mm.$^2$. If referred to the initial cross section of the sheet, the tensile strength is 15.4 kg./mm$^2$.

Example 9

A sheet as in Example 8, stretched and superficially peroxidized to an oxygen content of 0.029%, is immersed in methyl acrylate at 70° C. for 20 hours, then washed with methanol, to remove small amounts of physically absorbed monomer. The sheet is covered now by a very adherent layer of poly (methylacrylate), which is largely grafted onto the polypropylene. The increase in weight is 65%. The thickness has increased from 0.16 to 0.24 mm. The mechanical properties are now: $e=12\%$; $s=3$ kg./mm.$^2$. The sheets (as well as the yarns) thus treated can no longer be electrified by rubbing as can the original polypropylene. This electroconductive effect is noted even with smaller proportions of grafted methyl acrylate.

The following three examples show that the polymer grafted onto the surface of the peroxidized polymer adheres to the treated articles, as obtained in the foregoing examples, and cannot be removed by means of the solvents for the ordinary polymer. This shows that the adhesion is not merely of a physical nature but actually involves a chain grafting, in accordance with the mechanism indicated in the foregoing discussion.

Example 10

A skein of a prevailingly isotactic polypropylene yarn is extracted with ethyl ether for 24 hours to remove the small amounts of amorphous polypropylene which may be present, and peroxidized as in Example 3, to an oxygen content of 0.5%.

The mechanical characteristics of the yarn obtained are the following: $e=21\%$; $s=6.1$ g./den.

The skein is now immersed in styrene at 75° C. for 24 hours. After washing with methanol, the yarn is dried and then treated with boiling methyl ethyl ketone for 30 minutes, to remove all the polystyrene not bound chemically to the surface of the yarn. It is then washed again with methanol and dried. The increase in weight due to the grafted polystyrene is found to be of about 10%. The properties of this yarn are: $e=24\%$; $s=6$ g./den.

Example 11

A skein of a polypropylene yarn as in Example 10 is peroxidized superficially to a contact in peroxidic oxygen of 0.2%. The mechanical properties are: $e=16\%$; $s=5.75$ g./den. The skein is immersed in methyl methacrylate at 75° C. for 3 hours, washed with methanol and dried. It is then kept in acetone at 45° C. for 3 hours to remove the portion of poly (methylmethacrylate) not bound chemically to the surface of the yarn. After further washing with methanol and drying, a weight increase of 24%, due to grafting of poly (methyl-methacrylate) chains onto the surface, is noted.

The thus modified polypropylene yarn shows: $e=23\%$; $s=4.5$ g./den.

Example 12

A skein of yarn of a prevailingly isotactic polypropylene is peroxidized as in Example 4, to a content in peroxidic oxygen of 0.2%. The mechanical characteristics of the yarn are: $e=21\%$; $s=5.1$ g./den. The skein is immersed in a mixture comprising 60% methyl methacrylate and 40% toluene at 75° C. for 15 hours; it is then washed and dried. The skein is then kept in acetone at 45° C. for three hours to remove the portion of methyl methacrylate not bound chemically to the surface of the yarn. After further washing with methanol and drying, a weight increase of 21%, due to a grafting of poly (methyl-methacrylate) chains onto the surface thereof, is noted. The polypropylene yarn thus modified shows the following mechanical properties: $e=22\%$; $s=5.75$ g./den.

Example 13

Samples of blown isotactic polypropylene film of 0.1 mm. thickness, peroxidized to a content of peroxide oxygen of 0.03%, are dipped in various monomers for varying lengths of time and at different temperatures. The samples are then treated for ½ hour with boiling methyl ethyl ketone and dried under vacuum.

From the increase in weight the following percentages of grafted polymer are calculated:

| Monomer employed | Temperature, °C. | Time, minutes | Grafted polymer, percent by wt. |
| --- | --- | --- | --- |
| Methylmethacrylate | 80 | 30 | 90 |
| Methylacrylate [1] | 80 | 600 | 10 |
| Styrene | 50 | 180 | 15 |
| Styrene [2] | 80 | 300 | 5 |

[1] 50% in isopropyl alcohol.
[2] 70% in isopropyl alcohol.

Grafted polymers prepared as in the foregoing examples have interesting practical application. The chains grafted on the surface modify the behaviour of the hydrocarbon polymers considerably, conferring on them new and striking properties, which depend on the type of monomer used for the grafting and on the conditions under which the grafting reaction is carried out.

As shown in the examples which follow, it is possible, for example, to confer on high molecular weight linear hydrocarbon polymers, which are by themselves substantially resistant to dyeing, the capability of firmly absorbing organic dyes of various types.

Example 14

The polypropylene yarn of Example 12, having poly (methyl methacrylate) grafted thereon is first washed at 45° C. for one hour in a bath containing 5 g. per liter of neutral soap, then rinsed with warm water and dried.

100 g. of the yarn thus treated are dipped into a dyeing bath consisting of a 3 liters of warm water and 4 g. of the water-dispersible azo-dye obtained from diazo-di-p-aminoacetanilide and para-cresol. After about one hour at 70–75° C., the yarn is rinsed and dried. A bright and uniform yellow color having good general fastness is obtained. A sample of unmodified polypropylene yarn when dipped in the same dyeing bath under the same conditions remains perfectly colorless.

Example 15

5 g. of the azo-dye obtained from diazo-di-p-nitroaniline and ethyloxyethylaniline, in the form of a dispersible powder, are suspended in 3 liters of water at 50° C. 100 g. of the yarn of Example 12 are washed as described and then introduced into the bath thus prepared. The material is stirred at 70° C. for two hours, rinsed and dried. The yarn shows a beautiful red color having good fastness.

Example 16

100 g. of the same yarn of Example 12 are dyed at 74° C. for 2 hours in a bath consisting of 3 liters of water and 5 g. of the 1-amino-4-methylaminoanthraquinone dye, previously made dispersible in water by means of a suitable dispersing agent. After rinsing and drying the material shows a bright violet color.

In a comparison test carried out with a nongrafted polypropylene yarn, under the same conditions, practically no dyeing is obtained.

Example 17

A sample of blown isotactic polypropylene film, 0.1% thick, peroxidized to a peroxide oxygen content of 0.03% is immersed into a 25% water solution of acrylic acid, at 60° C.

After 30 hours the sample is taken out and washed with a 10% warm caustic soda solution, to eliminate the polymer of acrylic acid not chemically bound to the film. After further washing with diluted aqueous hydrochloric acid and warm water, the film is dried. A weight increase of 10% is observed.

The obtained film is dyed by dipping it for 3 hours in a 1% aqueous solution of methyl violet; an intensely coloured product is obtained. The colour is practically unchanged after a 24 hours treatment with boiling water. A sample of untreated film takes only a very light colouring which is not fast to boiling water.

*Example 18*

A sample of polypropylene staple fibre superficially peroxidized to a content of peroxide oxygen of 0.25% is immersed in monomeric styrene at 75° C. After 24 hours the sample is taken out and treated for 30 minutes with boiling methyl-ethyl ketone, to dissolve the polystyrene not chemically bound to the fibre. After washing with methanol and drying, a weight increase of 9%, due to grafted polystyrene, is observed.

The product obtained can easily be dyed with acetate dyes. Vivid shades of good overall fastness are obtained with the following dyes: Setacyl Yellow 36, Cibacet Scarlet 6, Cibacet Red 6, Cibacet Violet 5R. Similar results are obtained by grafting on the fiber methylmethacrylate chains. After peroxidizing to a 0.3% peroxide oxygen content and immersion in methylmethacrylate at 75° C. for 1 hour, the fibre is treated with acetone at 45° C. for 3 hours to remove the methylmethacrylate homopolymer, washed with methanol and dried. A 20% increase in weight is observed.

Intense shades of excellent fastness are obtained when dyeing the treated fibre with acetate dyes, particularly with Cibacet Red B, Setacyl Yellow 36 and Cibacet Violet RB.

*Example 19*

In this example the possibility is shown of imparting adhesive properties to a polypropylene film by grafting butyl acrylate chains on it.

This is obtained by immersing peroxidized blown films of isotactic polypropylene in alcoholic solutions of butyl acrylate. Chain transfer agents may be added to the solutions, to obtain grafted chains of smaller length which impart better adhesive properties to the film.

After the treatment the film is washed in warm acetone and dried. The following results are obtained by carrying out the treatment with butyl acrylate solutions at 80° C., for 3 hours:

| Butyl acrylate solution used | Percent Grafted Polymer |
| --- | --- |
| Isopropyl alcohol (1:1) | 4 |
| Propylene glycol (1:1) | 7.5 |
| Isopropyl Alcohol (1:1) + 5% CCl4 | 5 |
| Isopropyl Alcohol (1:1) + 1% lauryl mercaptane | 5 |

All the obtained films showed a certain degree of stickiness, which persisted after repeated washing in warm acetone.

Similar results can be obtained using as monomers certain vinyl ethers and unsaturated esters.

The linear, regular, head-to-tail polymers of propylene which are peroxidized in accordance with the present method can be obtained by polymerizing propylene with the aid of a catalyst obtained from a compound of a transition metal of the 4th to 6th groups of the periodic table and an organo-metallic compound of a metal of the 2nd or 3rd group of the periodic table, for example, by reaction of a titanium halide and an aluminum alkyl like aluminum triethyl, in a solvent inert to the polymers formed. The polymerization product may be a mixture of linear, head-to-tail polymers having no branches longer than the —CH$_3$— group of the starting propylene, which mixture comprises mainly non-isotactic (amorphous) and iso-tactic (crystallizable) polymers which can be separated by fractional dissolution. Thus, after removal of some oily, low molecular weight products soluble in acetone and usually present in the crude polypropylene in only small amounts, there can be obtained, by successive extraction of the polymerizate with ether and n-heptane, semi-solid to solid amorphous polymers, solid, partially crystalline polymers of higher molecular weight, and highly crystalline polymers of very high molecular weight and having fiber-forming properties. Usually, the high molecular weight, highly crystalline polypropylene comprises from 30 to 55% of the total polymer mixture.

Also, by selecting specific compounds of the transition metals in which the metal has a valency lower than the maximum valency corresponding to its position in the periodic table, for example titanium trichloride, the polymerization can be steered to the production of polypropylene which is substantially completely or even wholly crystalline.

The following is an example of the production of non-isotactic and isotactic polypropylenes which, in the form of shaped articles, can be peroxidized according to the present method.

A solution of 1.8 gms. of titanium tetrachloride in 50 ml. of anhydrous gasoline (B.P. 98° C.) is added dropwise at a temperature slightly lower than room temperature (5° C.–10° C.) to a solution of 11.4 gms. of triethyl aluminum in 150 ml. of the gasoline. The solution is further diluted to 500 ml. with gasoline and introduced into an oscillating dried and evacuated stainless steel autoclave of about 2 liters capacity. 190 gms. of liquid, carefully dried propylene are then pumped into the autoclave and heated, while agitated, to about 55° C.–60° C. After the pressure has fallen from the initial value of about 10 atms. to about 2 atms. an additional 160 gms. of propylene are added. The pressure thereafter falls at a lower rate and after about 20 hours no further decrease in pressure is observed. The residual gases are then vented, and consist chiefly of propylene (72.5 normal liters) and a small amount (0.2 N liters) of ethylene which probably results from decomposition of the catalyst. 95 gms. of methanol are then pumped into the autoclave to decompose the catalyst. 5.7 N liters of gas are evolved, more than 50% of which is propylene. The polymerization product comprising a solid mass drenched with gasoline and methanol is then extracted from the autoclave. It is suspended in di-isopropyl ether and the suspension is heated under strong stirring and while bubbling through gaseous HCl to render all inorganic compounds resulting from decompositon of the catalyst soluble. After four hours, a little methanol is added to the suspension to precipitate the polymer which may have been dissolved and the suspension is filtered under suction. The solid product thus obtained, after drying at 100° C. under reduced pressure, weighs 180 gms. and has an ash content of 0.22%. It is a white, spongy solid comprising a mixture of propylene polymers of a wide range of molecular weights, has a transparent, rubber-like appearance at 140° C., and definitely melts at 155° C. This mixture of propylene polymers can be molded at 130° C. to flexible sheets containing amorphous and crystalline portions, as shown by X-ray diffraction pattern.

A few grams of a very viscous oil are recovered from the filtered liquid, after distillation of the solvent.

The solid propylene polymer mixture can be separated into a small amount of oily, low molecular weight products and several larger fractions of amorphous and crystalline products by fractional dissolution using, successively, boiling acetone, ethyl ether and n-heptane. The fractionation is conducted in an extractor of the Kumagawa type and the extraction with each solvent is continued until the percolating solvent does not contain any appreciable quantity of extracted polymer.

The acetone-extracted fraction (A) consists of the oily, low molecular weight products and amounts to only 2.8% of the solid polymer obtained.

The ether extracted fraction (B) amounts to 39% of the total polymer and after evaporation of the solvent under vacuum (intrinsic viscosity=1) is completely amorphous similarly to an unvulcanized elastomer.

The n-heptane extracted fraction (C) amounting to 19% of the total polymer has, after evaporation of the solvent under vacuum, an intrinsic viscosity of 1.2–1.3 and is, at room temperature, a partially crystalline solid which melts completely at 150° C. and which also has the properties of an elastomer but up to temperatures higher than the temperatures at which the fraction (B) shows the elastomer-like properties.

The residue (D) insoluble in all three of the extracting solvents, has a density of about 0.92 and an intrinsic viscosity, determined in tetrahydronaphthalene solution, of 3.33 (100 ml./g.). A 1% solution in tetralin has a specific viscosity of 0.374. This fraction (D) undergoes syneresis starting at 120° C., loses its crystallinity above 150° C., and at 170° C. is wholly converted into a transparent, very viscous mass.

By molding fraction (D) in a flat press at 140–150° C., plates or sheets are obtained which appear crystalline under the X-rays, show a 700% elongation, and a breaking load of 350 kg./sq. cm. referred to the original section.

Fraction (D) can be formed into filaments or threads by extruding it, in softened condition, through a spinneret and then subjecting the extruded filaments to warm or cold stretching. The stretched filament is highly crystalline and has a very high breaking load. Thus, a cold-stretched thread of this polymer having a diameter of 0.3 mm. after stretching may have, for instance, a breaking load of 32 kg./sq. mm. and an elongation of 40%.

The process of the invention is illustrated in the accompanying flow-sheet, as applied to a sheet comprising isotactic polypropylene.

Amorphous copolymers of propylene and ethylene suitable for peroxidation under the conditions of this invention can be prepared by using, as the copolymerization catalyst, a reaction product of a metallo-organic compound of a metal of the 2nd or 3rd group of the periodic table and a transition metal compound in which the metal has the maximum valency corresponding to its position in the periodic table and which is amorphous and soluble or readily dispersible in the polymerization solvent, such as, for instance, vanadium tetrachloride or vanadium oxychloride.

The following is an example of the production of an amorphous linear copolymer of propylene and ethylene which can be peroxidized under the conditions of this invention.

A solution of 0.025 mole trihexyl aluminum in 300 cc. n-heptane is introduced under nitrogen into a 2080 cc. autoclave. 185 g. of a propylene-propane mixture containing 88.5% propylene, and 12 g. of ethylene are then added. Thus, the mole ratio of propylene to ethylene is 9.05:1. The mixture is heated under agitation up to 45° C. and at this temperature a solution of 0.008 mole $VOCl_3$ in 50 cc. heptane is injected into the autoclave. After a few minutes, a spontaneous temperature increase from 45° C. to 65° C. is noticed while the pressure drops from 28 to 23 atms. 150 cc. of methanol are then injected into the autoclave, to decompose the catalyst and stop the reaction. The polymerization product is discharged and purified by treatment with solvents acidified with hydrochloric acid, and subsequent complete coagulation with methanol. 43 g. of product are thus obtained with a conversion corresponding to 24.4% of the monomers employed. The copolymer obtained is then fractionated by extraction with hot solvents.

The acetone extract corresponds to 14% of the total product and consists of low molecular weight copolymers of oily appearance. In the infra-red spectrum of this fraction, both the band due to the methyl groups and the bands due to sequences of methylene groups are very clearly visible.

The ether extract corresponds to 66.4% and consists of a solid product having the appearance of a non-vulcanized elastomer. This fraction shows an intrinsic viscosity of 0.89 (corresponding to a molecular weight of about 27,000) and appears amorphous at an X-ray examination, with a maximum of the amorphous spectrum which is decidedly shifted as compared to that of an amorphous polypropylene. From the infra-red spectrum observed when this fraction is submitted to infra-red examination it is determined that sequences of methylene groups yielding bands between 13.4 and 13.8 microns are present, and it is possible to calculate a propylene content of about 85% by weight.

The heptane extract, corresponding to 19.6% of the total, is a solid of intrinsic viscosity 2.44. The X-ray spectrum does not indicate any crystallinity but shows a maximum of the amorphous which is decidedly shifted with respect to that of amorphous propylene polymers. From the infra-red spectrum of this fraction, a propylene content of 48% can be calculated. No residue remains after the extraction with heptane, proving that the product is a true copolymer and that no pure ethylene polymer is formed.

It will be understood that the foregoing examples of the production of the amorphous and crystalline polypropylenes, and of the amorphous copolymer of propylene and ethylene are illustrative only. Other conditions which may lead to the production of these linear polymers and copolymers may be used. In the copolymers, the amount of ethylene by weight in the copolymer molecule may be from 5% to 70%.

Some changes may be made in practicing our invention, without departing from our invention. It is to be understood, therefore, that we intend to claim as part of our invention any variations, substitutions and changes that lie within the scope of our invention and of the appended claims, and intend to include within the scope of said claims such changes as may be apparent to those skilled in the art in the practice of the principles of our invention as set forth in this specification.

What is claimed is:

1. A process for the production of shaped articles comprising linear high molecular weight polymers selected from the group consisting of isotactic polymers of propylene, non-isotactic polymers of propylene and ethylene, and non-isotactic copolymers of propylene and ethylene, and having grafted thereon polymeric chains formed by the polymerization of a monomer which is polymerizable by a radical mechanism, said process comprising first contacting the shaped articles with a gas containing molecular oxygen at a temperature of 50 to 120° C. until a predetermined amount of oxygen is bound to the polymer chains in the form of hydroperoxide groups, and thereafter immersing the article, under polymerizing conditions, in a monomer capable of being polymerized with a radical mechanism, whereby said monomer is polymerizer, with the aid of the hydroperoxide groups bound to the polymer comprising the shaped article, to polymeric chains which are chemically grafted onto the polymeric linear chains of said article.

2. The process according to claim 1, characterized in that the hydroperoxide groups are introduced into the polymer comprising the shaped article by exposing the article to the action of molecular oxygen at a temperature between 60° C. and 100° C.

3. The process according to claim 2, characterized in that the hydroperoxide groups are introduced into the polymer comprising the shaped article by exposing the article to the action of molecular oxygen at a temperature between 60° C. and 90° C. for a time such that no significant change in the average molecular weight of the polymer results from the peroxidation.

4. The process according to claim 1, characterized in that the hydroperoxide groups are introduced into the polymer by contacting the shaped article with air.

5. The process according to claim 1, characterized in that the hydroperoxide groups are introduced into the polymer by contacting the shaped article with a mixture containing from 10% to 100% of molecular oxygen and an inert gas under a pressure between normal atmospheric pressure and under 10 atmospheres.

6. The process according to claim 5, characterized in that the inert gas mixed with the molecular oxygen is nitrogen.

7. The process according to claim 1, characterized in that the shaped article comprises an isotactic crystalline polypropylene and the introduction of the hydroperoxide groups is limited essentially to the surface of the article.

8. The process according to claim 7, characterized in that the shaped article is contacted with the gas containing molecular oxygen until the oxygen content of the shaped article of the polymer is between 0.01 and 0.05 g./m.$^2$.

9. The process according to claim 1, characterized in that the shaped article comprises a linear polymer of propylene having a molecular weight above 20,000.

10. The process according to claim 9, characterized in that the shaped article comprises an amorphous, linear polymer of propylene.

11. The process according to claim 1, characterized in that the shaped article comprises an amorphous, linear copolymer of propylene and ethylene.

12. The process according to claim 1, characterized in that the shaped article comprises an amorphous, linear copolymer of propylene and ethylene having a molecular weight above 20,000.

13. A process according to claim 1, characterized in that the shaped articles contacted with the gas containing molecular oxygen comprise sheets, filaments and the like formed of a linear, high molecular weight isotactic polypropylene.

14. The process according to claim 1, characterized in that the shaped articles contacted with the gas containing molecular oxygen comprise films and thin sheets of an amorphous linear copolymer of propylene and ethylene having a substantial surface area, and the introduction of the hydroperoxide groups into the copolymer takes place at the surface and at the interior of the shaped article.

15. The process according to claim 1, characterized in that the polymeric chains of the monomer capable of being polymerized with the aid of a radical mechanism are grafted onto the surface of the shaped article containing the hydroperoxide groups by immersing the article in the polymerizable monomer in the gaseous phase until the latter is polymerized and the polymeric chains are grafted onto the shaped article.

16. The process according to claim 1, characterized in that the polymeric chains of the monomer capable of being polymerized with the aid of a radical mechanism are grafted onto the surface of the shaped article containing the hydroperoxide groups by immersing the article in the polymerizable monomer in the liquid phase until the latter is polymerized and the polymeric chains are grafted onto the shaped article.

17. The process according to claim 1, characterized in that the polymeric chains of the monomer capable of being polymerized with the aid of a radical mechanism are grafted onto the surface of the shaped article containing the hydroperoxide groups by immersing the article in a solution of the polymerizable monomer until the latter is polymerized and the polymeric chains are grafted onto the shaped article.

18. The process according to claim 1, characterized in that the polymeric chains of the monomer capable of being polymerized with the aid of a radical mechanism are grafted onto the surface of the shaped article containing the hydroperoxide groups by immersing the article in the polymerizable monomer until the latter is polymerized and the polymeric chains are grafted onto the shaped article.

19. The process according to claim 18, characterized in that the immersion of the shaped article in the polymerizable monomer is carried out at a temperature between 40° C. and 100° C.

20. The process according to claim 18, characterized in that the immersion of the shaped article in the polymerizable monomer is carried out at a temperature between 50° C. and 80° C.

21. The process according to claim 18, characterized in that the monomer capable of being polymerized with a radical mechanism in a vinyl compound.

22. The process according to claim 18, characterized in that the monomer capable of being polymerized with a radical mechanism is a vinylidene compound.

23. The process according to claim 18, characterized in that the monomer capable of being polymerized with a radical mechanism is an alkyl acrylate.

24. The process according to claim 18, characterized in that the monomer capable of being polymerized with a radical mechanism is acrylic acid.

25. The process according to claim 18, characterized in that the monomer capable of being polymerized with a radical mechanism is an alkyl methacrylate.

26. The process according to claim 18, characterized in that the monomer capable of being polymerized with a radical mechanism is styrene.

27. The process according to claim 18, characterized in that the monomer capable of being polymerized with a radical mechanism is methyl methacrylate.

28. The process according to claim 18, characterized in that the monomer capable of being polymerized with a radical mechanism is methyl acrylate.

29. The process according to claim 18, characterized in that the monomer capable of being polymerized with a radical mechanism is butyl acrylate.

References Cited in the file of this patent

UNITED STATES PATENTS

| | | |
|---|---|---|
| 2,122,826 | Van Peski | July 5, 1938 |
| 2,461,966 | Davis | Feb. 15, 1949 |
| 2,668,134 | Horton | Feb. 2, 1954 |
| 2,715,075 | Wolinski | Aug. 9, 1955 |
| 2,767,103 | Loukomsky | Oct. 16, 1956 |
| 2,837,496 | Vandenberg | June 3, 1958 |
| 2,907,675 | Gaylord | Oct. 6, 1959 |

FOREIGN PATENTS

| | | |
|---|---|---|
| 538,782 | Belgium | Dec. 6, 1955 |

UNITED STATES PATENT OFFICE
CERTIFICATE OF CORRECTION

Patent No. 3,020,174             February 6, 1962

Giulio Natta et al.

It is hereby certified that error appears in the above numbered patent requiring correction and that the said Letters Patent should read as corrected below.

Column 2, lines 48 and 49, for "peoxidized" read -- peroxidized --; column 12, line 67, for "polymerizer" read -- polymerized --.

Signed and sealed this 28th day of August 1962.

(SEAL)
Attest:

ESTON G. JOHNSON
Attesting Officer

DAVID L. LADD
Commissioner of Patents